United States Patent
Brown (10) Patent No.: US 7,609,963 B2
(45) Date of Patent: Oct. 27, 2009

(54) APPARATUS TO PRODUCE SPECTRUMS

(76) Inventor: Roger Wayne Brown, 810 W. Villa Maria Dr., Phoenix, AZ (US) 85023

( * ) Notice: Subject to any disclaimer, the term of this patent is extended or adjusted under 35 U.S.C. 154(b) by 265 days.

(21) Appl. No.: 11/416,232

(22) Filed: May 3, 2006

(65) Prior Publication Data

US 2007/0013905 A1   Jan. 18, 2007

Related U.S. Application Data

(60) Provisional application No. 60/698,045, filed on Jul. 12, 2005.

(51) Int. Cl.
*G03B 11/00* (2006.01)

(52) U.S. Cl. .................. 396/544; 396/71; 348/335; 359/566

(58) Field of Classification Search ............... 356/300; 359/566; 348/336; 396/71, 544
See application file for complete search history.

(56) References Cited

U.S. PATENT DOCUMENTS

| | | | | |
|---|---|---|---|---|
| 3,753,618 | A | * | 8/1973 | Haley .................. 356/334 |
| 4,805,990 | A | | 2/1989 | Edwards |
| 4,850,706 | A | * | 7/1989 | Mikes .................. 356/328 |
| 4,918,475 | A | * | 4/1990 | Edwards ................ 396/429 |
| 5,526,194 | A | * | 6/1996 | Ruffell ................. 359/827 |
| 5,589,717 | A | * | 12/1996 | Chau ................... 356/328 |
| 6,157,781 | A | * | 12/2000 | Konno et al. ........... 396/544 |
| 6,304,324 | B1 | | 10/2001 | Iwasaki |
| 6,549,280 | B2 | | 4/2003 | Riccardo et al. |
| 6,590,648 | B1 | | 7/2003 | Orelli |
| 6,813,018 | B2 | | 11/2004 | Richman |
| 2005/0190448 | A1 | * | 9/2005 | Barziza ................. 359/566 |
| 2006/0139636 | A1 | * | 6/2006 | Kerstan et al. .......... 356/328 |
| 2006/0279732 | A1 | * | 12/2006 | Wang et al. ............ 356/326 |
| 2008/0013960 | A1 | * | 1/2008 | Tearney et al. .......... 398/139 |

OTHER PUBLICATIONS http://starspectroscope.com/ProductList.html, "Product List", Mar. 5, 2008, Rainbow Optics, pp. 1-2.*
http://starspectroscope.com/spectroscopedesign.html, "Star Spectroscope Design, Visual/Photo/CCD", Mar. 5, 2008, Rainbow Optics, p. 1.*
Disclosure Document, US# 580,157, filed with PTO Jun. 15, 2005 "Method to Produce Spectral Images", by Roger W. Brown.

(Continued)

*Primary Examiner*—Kara E Geisel (57) ABSTRACT

A method of placing a grating material at an optimum distance from a sensor that will produce a reference spectrum on that sensor. In a preferred embodiment of the present invention, a device with a diffraction grating end will protrude into the empty lens well of a camera and with the camera inserted into a telescope eyepiece holder will focus both a image of an object, that the telescope is pointed to, and its spectrum onto the light sensor in the camera. This dual image, called a reference spectrum, allows the separation between the image of the object and a point in the image of its spectrum to be determined quickly. This separation distance to the spectral point within the spectrum is then a referenced distance. Once a reference distance is known it is then used to determine the wavelength of any other point or spectral line within the spectrum.

5 Claims, 6 Drawing Sheets

OTHER PUBLICATIONS

U.S. Appl. No. 60/698,045, filed with PTO Jul. 12, 2005, "Apparatus to Produce Spectrums", by Roger W. Brown.

Rainbow Optics (company), Web Site: starspectroscope.com, Mar. 20, 2008.

SBIG (company name), Web Site: sbig.com, Mar. 20, 2008.

Baader Planetarium (company name—in Germany), Web Site: baader-planetarium.com, Mar. 20, 2008.

* cited by examiner

$$\theta_H = \mathrm{Sin}^{-1}(\lambda * L_H / 1 \times 10^6)$$

APPARATUS TO PRODUCE SPECTRUMS

RELATED APPLICATIONS

This application claims priority on provisional application No. 60/698,045 filed Jul. 12, 2005, and Disclosure Document number 580,157 filed Jun. 15, 2005.

The present application is related to U.S. Pat. No. 6,813,018, issued Nov. 2, 2004, for HYPERSPECTRAL IMAGER, by Richman, included by reference herein.

The present application is related to U.S. Pat. No. 6,549,280, issued Apr. 15, 2003, for SPECTROMETER WITH DOUBLE OFF-AXIS SCHMIDT TELESCOPE, by Riccardo, et. al., included by reference herein.

The present application is related to U.S. Pat. No. 6,304,324, issued Oct. 16, 2001, for METHOD OF CALCULATING OPTICAL FREQUENCY SPECTRUM, by Iwasaki, included by reference herein.

The present application is related to U.S. Pat. No. 4,805,990, issued Feb. 21, 1989, for APPARATUS FOR VIEWING A REFRACTED IMAGE AND PHOTOGRAPHIC METHOD, by Edwards, included by reference herein.

The present application is related to U.S. Pat. No. 6,590,648, issued Jul. 8, 2003, for APPARATUS FOR MEASURING LIGHT, by von Orelli, et. al, included by reference herein.

Related Disclosure Document Number 580,157; filed Jun. 15, 2005; for Method to Produce Spectral Images; by Roger Brown, Ph.D.

Related Provisional Patent Application Document No. 60/698,045; filed Jul. 12, 2005; for Apparatus to Produce Spectrums; by Roger Brown, Ph.D.

FIELD OF THE INVENTION

The present invention relates to a way to produce spectrums and, more particularly, to produce referenced spectrums.

Class/Subclass: 356/305, 356/302

BACKGROUND OF THE INVENTION

Both amateur and professional scientists have been obtaining the spectrum of objects for over a century. In the field of astronomy knowing the spectral makeup of a star will tell a lot about it and the area of space where the star is located. One method is by using a telescope and pointing it at a star and inserting a spectrum separating device between the telescope and the observer which will make the star's spectrum visible. In the area of chemistry and physics by knowing the spectral characteristics of an object will help to identify its makeup and other physical parameters of the object.

Currently there are two methods in general use that will separate a beam of light into a spectrum. They are prismatic devices and grating devices. Prismatic devices are generally associated with prisms, which are solid objects made from some sort of transparent material. Grating devices fall into two groups: transmission and reflective. They both share the common ability to separate light into its colors by use of a thin multi-lined grating extending very slightly from one of their surfaces. A common type of material in general use is transparent diffraction grating material.

Grating materials are generally only available as a single plane grating. A single plane grating produces all orders of an object's spectrum in a single horizontal line running symmetrically on both sides of the object's image. This is the commonest type of grating and has been around for many years.

Recently advances in grating technology has produced dual plane gratings. A dual plane grating produces all orders of an object's spectrum in two orthogonal lines, one horizontal and one vertical. It additionally produces two secondary spectrum lines, that are products of the interaction of the two crossed gratings, that produce spectrums that are rotated 45 degrees from the first two orthogonal spectral lines.

In order for the information contained in the spectrum to be of use it generally needs to be recorded or stored. This is usually done by either writing down what information an observer is able to see by looking at the spectrum, or by taking a picture of the spectrum.

Finding a device that will present a lot of the information contained within a spectrum of an object and one that will work with readily available equipment is difficult. The solution would be to use an available camera equipped with a device which would mate to the camera coupled to an appropriate light collector to capture the spectrum.

The current state of art has produced a range of spectrum catching devices like, cameras, storage mediums, and optical capture devices like telescopes both large and small. However, few of these devices will work with the other products needed to produce, store and retrieve a spectrum's information. Different manufacturers gravitate to different solutions depending on their commercial clients. This leaves most of the available spectrum equipment out of the reach of ordinary people's budgets.

Because of the lack of availability for the various equipments required to produce spectrums by the manufacturers of spectrum devices the majority of the users of this type of equipment have gravitated into two widely divergent groups. The first are the commercial users, which also include the larger engineering schools and universities, and the second group is all of the rest. The quality of the spectrum devices available to the last group is severely lacking in spectral detail, available tool sets, compatibility and instruction to use the various components of the system required to capture an object's spectrum.

A typical system, for an individual that desires detailed spectral line information, is to buy one of the SBIG CCD cameras at a cost of several thousand dollars then for an additional cost of several thousands of dollars add a spectrum device that will work only with that camera, but these two items alone aren't sufficient to detail a spectrum so the list goes on and the price tag approaches the tens of thousands of dollars and all just to produce the picture of a small colored line from a bright object. The cost continues to go up as the object becomes dimmer.

This cost is prohibitive for most prospective users and few schools and colleges can spend this level of money for equipment that has such a narrow field of use. If the cost could be reduced significantly without requiring additional equipment costing thousands of dollars more then this exciting field would get more interest and use.

What is needed is a means where the ordinary person can purchase a spectrum device and fix it to their camera and produce a spectrum of an object to include the spectral line information contained within the spectrum.

The most notable use would be for amateur astronomers to be able to use their telescopes equipped with an inexpensive type camera and a spectrum separation device to photograph the spectrum of stars and planets. Another use would be for school teachers to use available CCD cameras to produce spectrum pictures for their students, another use would be for chemical and physical field teams to be able to use small portable, or even throw away, camera systems along with high resolution spectrum recording equipment.

A visual spectrum filter product is made by Rainbow Optics. Here, they insert a single plane grating material inside an eyepiece filter cell to be mounted at the bottom of an eyepiece that is already threaded for standard 1.25" filters. They have very recently started advertising their visual spectrum device for CCD photography. When it is used with a camera it is mounted external to the camera's lens housing filter threads. The device they sell for CCD use is identical to the unit they sell for visual use. Their device is sold with a cylindrical lens that is used to make the spectrum visually taller but this attachment won't work when attached to a camera as this attachment is strictly for visual use. They are marketing their device for $250. Their device was first produced and sold in 1994 and they have not applied for a patent for it, as far as the inventor has been able to find out. Their web site address is: starspectroscope.com A second manufacturer makes a model SGS spectrum device for two their own CCD cameras to be used with standard 1.25" eyepieces. Their unit will not work with cameras made by other manufacturers or with most of their other cameras. Their unit is a large complicated box utilizing a single plane diffraction grating, and LED and other optics to produce the spectrum. Their device is incapable of producing a referenced spectrum. This company is SBIG Astronomical Instruments. Their device without a camera or other hardware sells for $5000.00. They have been marketing this device since 1998 and have not applied for a patent for it, as far as the inventor has been able to find out. Their web site address is: sbig.com A third manufacturer Baader Planetarium located in Germany also sells a single plane grating unit almost identical to the one made by Rainbow Optics. It is sold strictly as a device to be used for visual observations mounted to an eyepiece and nothing more. Their device is sold with a cylindrical lens that is used to make the spectrum visually taller. As far as the inventor knows they are not advertising their unit for CCD use. As far as the inventor has been able to find out they have not applied for any type of patent on their device. It is not known how long they have been offering their unit. Their web site address is: http://www.baader-planetarium.com/

The devices sold by Rainbow Optics and Baader Planetarium use a 200 l/mm blazed grating that produces a dim low quality spectrum as its spread out very little and has a very narrow bandwidth. This is because it is mounted too far from the sensor. The spectrum their units produce can't be used with dim stars as their spectrum is so tall with their cylindrical lens that its intensity quickly falls below the threshold of light sensors and other capture devices. Using a cylindrical lens with these devices will also distort the image of the spectrum as well as greatly reduce its intensity. As such these devices are generally limited to 3rd or 4th magnitude stars because of their visual design, while the magnitude limit of the present invention exceeds 11th magnitude stars.

A major problem with using these two devices on a CCD camera is that because they use a 200 lines/mm grating the spectral image is exceedingly small on the CCD chip, usually covering less than 20% of the chips width. Such small use of the chip results in extremely low resolution spectrums with little to no contained information content.

Another major drawback with their product is that they both use a blazed grating. Their gratings are designed for visual use with a blaze wavelength of 550 nm. This greatly reduces the bandwidth of their devices which is generally limited to 420 nm to 670 nm. The bandwidth of most inexpensive CCD cameras extends from 390 nm to over 950 nm so using a blazed grating with these cameras greatly reduces the bandwidth gain these cameras are capable of producing.

Another drawback with using blazed gratings is the spectrums they produce are bell shaped, with respect to intensity versus wavelength efficiency, instead of producing flat spectrums as is generated by non-blazed gratings. This makes calibration of the spectrum blazed gratings produce very difficult.

One of the many objections users have with devices from these two companies is that their devices are designed strictly for visual use and as such it is extremely difficult to adapt them to work on a CCD camera. Their units were only designed to be used with a threaded telescope eyepiece and they don't offer any adapters to fit most CCD cameras, and neither of these two companies offer any device that is designed to fit inside the lens housing of a camera or offer a devise designed to fill the film plane or CCD chip of a camera. Because of the course grating that they both use in their devices the spectrums produced are of little value due to the low resolution available with course gratings, and it is extremely difficult to resolve and identify individual spectral lines with their devices which is the main purpose of capturing an object's spectrum.

The device sold by SBIG is priced far too high to bring it into general use. While this device does produce photographable spectrums of good resolution it doesn't perform well with dim stars due to the extra light loss within their system. While their device does produce a high quality spectrum, it does not produce a reference spectrum and requires a very complicated means to determine the spectrum's wavelength information. They do not offer Angstrom level referencing or calibration tools with their unit and leave this complicated task to the user to solve on their own. Their device will only work with two of the many cameras that they made and will work with no other cameras made by anyone else.

It is therefore an object of the invention to produce a reference spectrum.

It is another object of the invention to produce a compact spectrum.

It is another object of the invention to produce a high resolution spectrum.

It is another object of the invention to produce a spectrum of an object.

SUMMARY OF THE INVENTION

In accordance with the present invention, there is provided a method of placing a grating material at an optimum distance from a sensor that will produce a reference spectrum on that sensor.

BRIEF DESCRIPTION OF THE DRAWINGS

A complete understanding of the present invention may be obtained by reference to the accompanying drawings, when considered in conjunction with the subsequent, detailed description, in which:

FIG. 4 is a front elevation view of a housing with a grating covering the top end of the housing, while the bottom end of the housing allows the light to pass through;

FIG. 5 is a front elevation view of a housing with a grating covering the top end of the housing, while the bottom end of the housing is fitted to a washer which is fitted to a lower housing whose bottom allows the light to pass through; and FIG. 6 is a front elevation view of a large housing with a large washer covering its top and a grating is covering the open part of the large washer, while the bottom end of the large housing allows the light to pass through.

For purposes of clarity and brevity, like elements and components will bear the same designations and numbering throughout the Figures.

DESCRIPTION OF THE PREFERRED EMBODIMENT

Overview

By fabricating the spectrum 26 separation device in such a manner that it will fit within the confines of the empty lens chamber, just in front of the sensor 27, of an available camera will provide a means to produce high quality referenced spectrums with little or no additional cost for other expensive equipment as is generally required.

The selection of a spectrum 26 device lends itself readily to using a grating 30 type of spectrum 26 device. These are generally easier to manufacture and are generally lighter in weight then are prism devices thereby reducing cost of manufacturer.

In order for any spectrum 26 device to provide the maximum amount of information the distance between itself and the light sensor 27, be it film, the human eye, or a CCD chip or anything else that is sensitive to light of any wavelength in the visible, ultraviolet and or infrared, is very critical.

In current technology the distance between the spectral device and the light sensor 27 is fixed not by what is the best separation distance but by what ever is the distance between the filter ring on the front of the capture device and the light sensor 27. This distance in almost every instance is many times greater then the optimum separation, thus current devices produce a very low quality spectrum 26.

The first consideration in producing a high quality spectrum 26, is that the spectrum 26 image should be no larger than the maximum size of the light sensor 27. If it is larger than the sensor 27 then successive images will have to be taken and the appropriate splice will have to be made so there is little or no overlap between the spectral images, otherwise it will be near impossible to determine any wavelength information. This is not as easy as it may sound for there are no general reference marks on the spectrum 26 to indicate where the various sections should be spliced. To minimize this issue the entire spectrum 26 should be designed to fit on no more than one width of the light sensor 27.

The next consideration, is one of measurement ease. If the object itself as well as its spectrum 26 were to be on the same image then problems of looking for reference markers would be greatly reduced or eliminated. This would bring the device down to the arena where ordinary people could produce high quality spectrums without having to spend large sums of money. If the image of the object is not located on the same image as that of the spectrum 26 then exotic methods must be used to determine exactly where the reference marks within the spectrum's image are located. This is not an easy task even with today's engineering tools.

From the above considerations the optimum location of the spectrum 26 device would distance it from the light sensor 27 at a location such that the image of the object would be on one edge of the light sensor 27 with the object's spectrum 26 extending from about midway on the light sensor 27 all the way to the other edge of the light sensor 27. When the spectral device is located at the optimum distance from the sensor 27 it would produce a referenced spectrum 26 of the object being imaged, as shown in FIG. 1.

A referenced spectrum 26 is one where the unconstrained image of the object and the image of its spectrum 26, in whole or in part, are contained within a single image. Whereas, the true separation between the object and its spectral component can be accurately determined. The location of the image of the object would provide the reference point for that spectrum 26. An illustration of a simple referenced spectrum is shown in FIG. 1. FIG. 2 also illustrates a referenced spectrum but this one is more complicated as it would span two images, see also FIG. 3.

Figure 1:
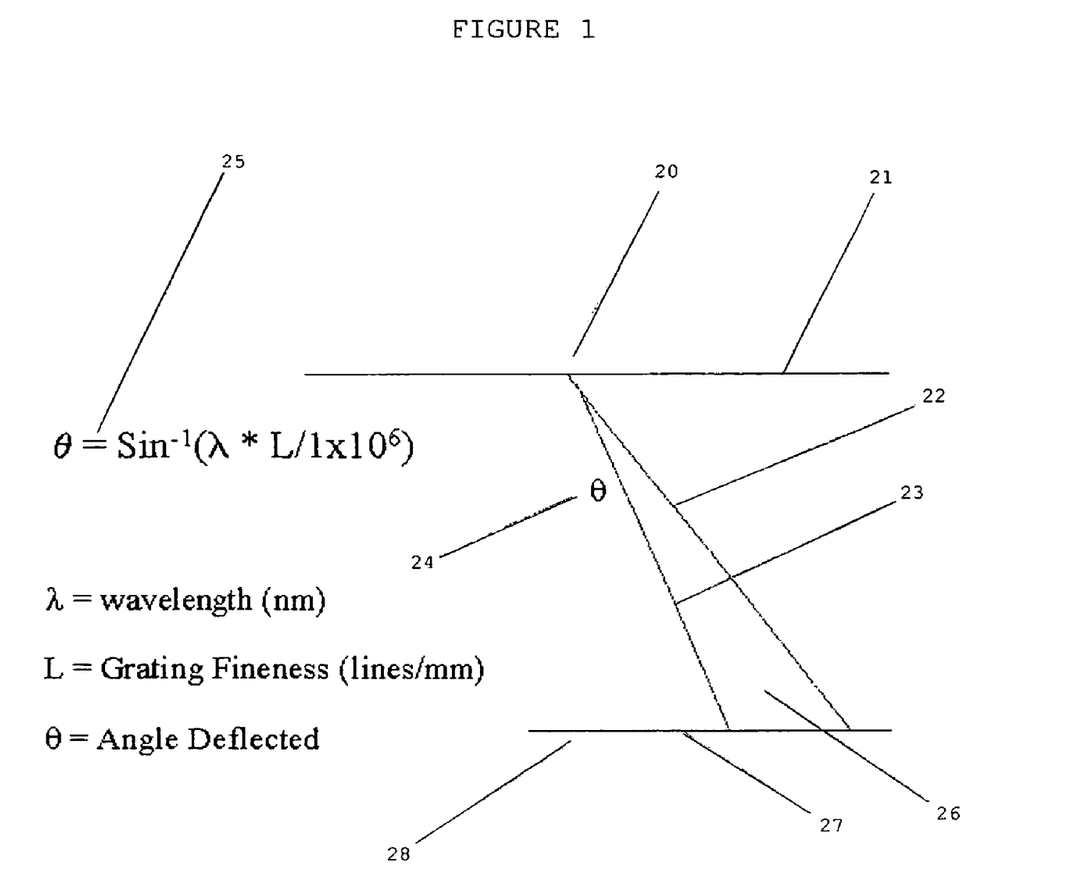
FIG. 1 is a front detail view of a light ray from an object passing trough a coarse grating and being separated into a colored spectrum with the object's image located to the left of its full spectrum and both images fall on the sensor.
Figure 2:
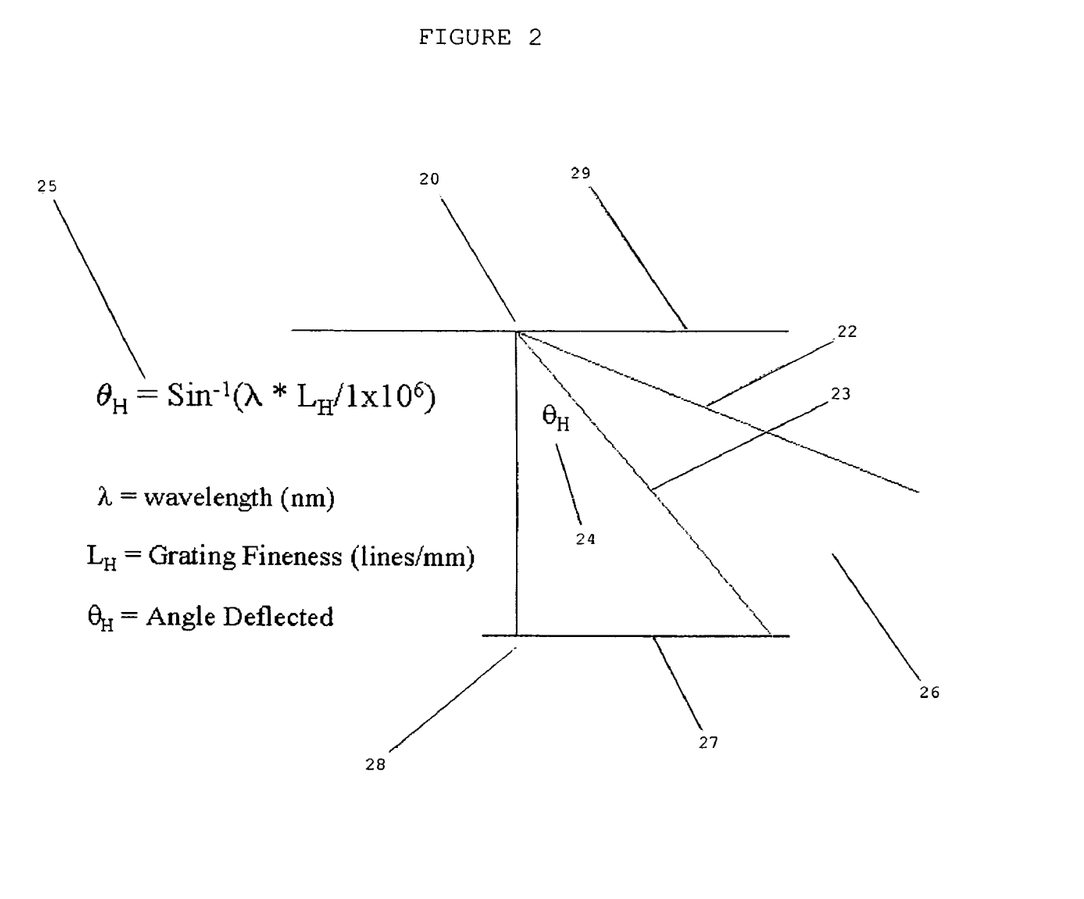
FIG. 2 is a front detail view of a light ray from an object passing trough a fine grating and being separated into a colored spectrum with the object's image located to the left of the blue portion of its spectrum and both images fall on the sensor.

By producing a spectrum 26 that is contained in one image, refer to FIG. 1, will also produce a much brighter spectrum 26 image than one that is spread out over multiple images. A more compact brighter spectral image will allow much dimmer objects to have their spectrum 26 recorded then is possible with the dimmer multiple image spectrums available today.

With this type of device the user would be able to see both the object and its spectrum 26 at the same time. With this information it would be quite easy to quickly determine wavelength information within the spectrum 26 as the distance between the object and points on its spectrum 26 can be easily measured and using the equation 25, shown in FIG. 1, the wavelength of these points can be determined.

Figure 3:
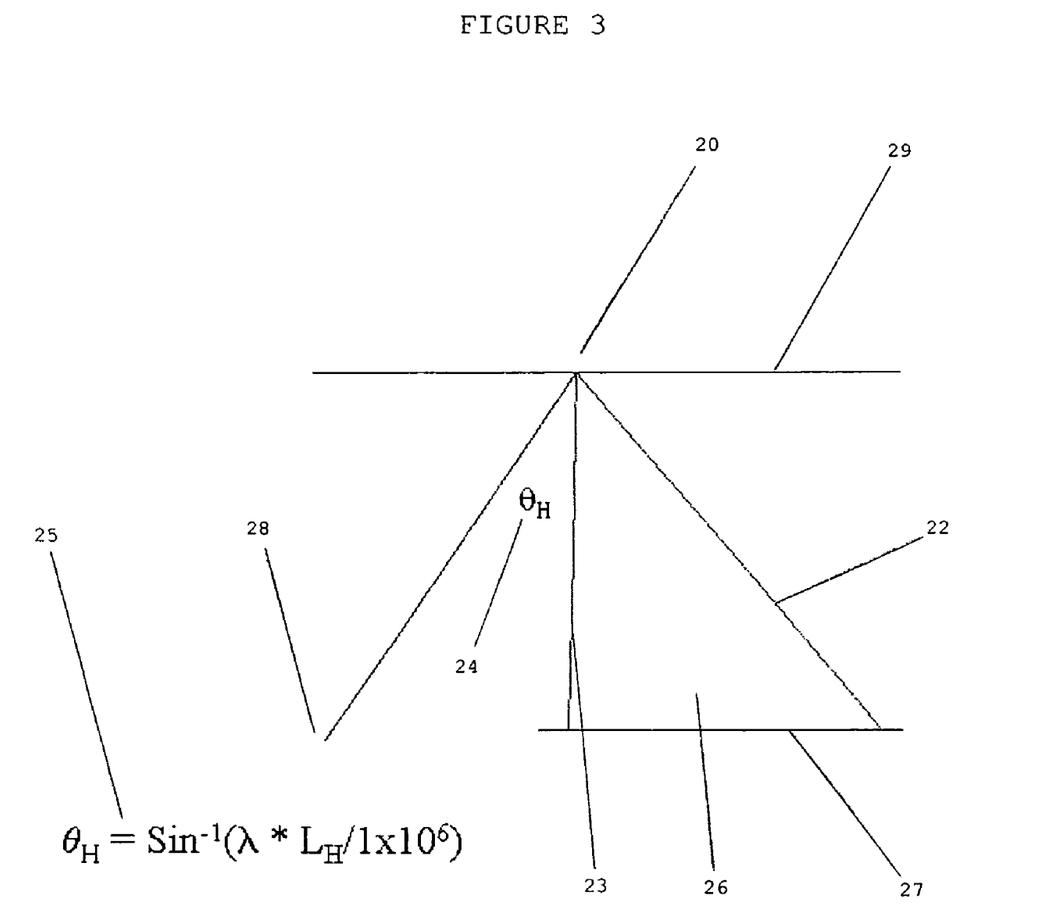
FIG. 3 is a front detail view of a light ray from an object passing trough a fine grating and being separated into a colored spectrum with the object's image located off, and to the left, of the sensor and its full spectrum falling on the sensor.

A device operating as shown in FIGS. 2 and 3 can also produce a referenced spectrum as long as the unconstrained image of the object and the blue end of its spectrum fall on the sensor at the same time as shown in FIG. 2. The distance between the object and the blue end of its spectrum is then used as the reference which would be used when determining wavelength information found in its full spectrum as illustrated in FIG. 3.

In order for a spectral device to be located at the optimum distance from the light sensor 27 it must fit elsewhere than at a camera's typical filter location which is generally at the front of the lens assembly, which is where these devices are currently constrained to be located.

In order for a spectral device to gain wide acceptance it needs to be very easy to use with little to no instruction needed, and it needs to be compatible with cameras available today. The above considerations would provide a device that would be easy to use and understand and yet provide a referenced spectral image that could be further analyzed in detail.

Figure 4:
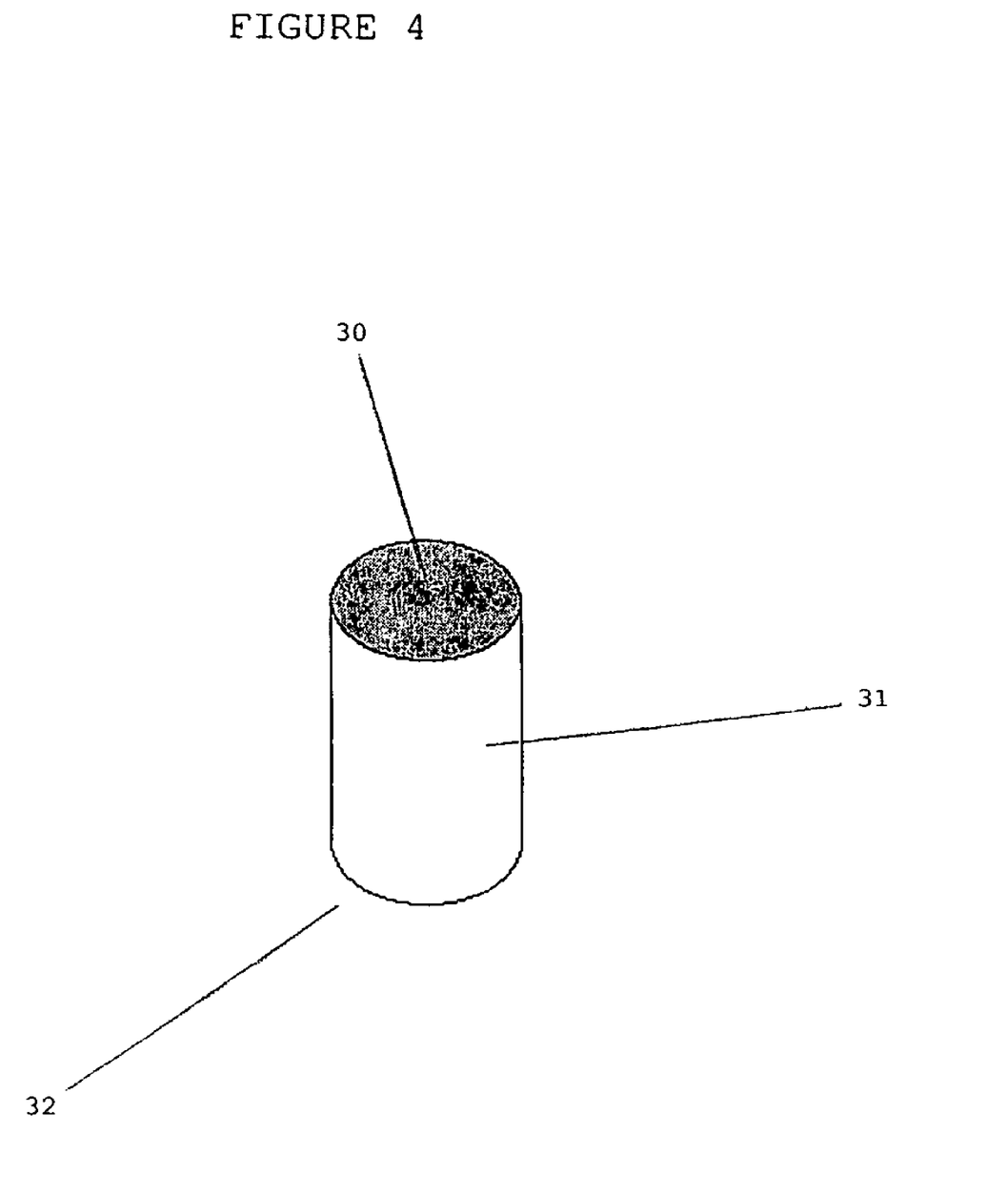
Figure 5:
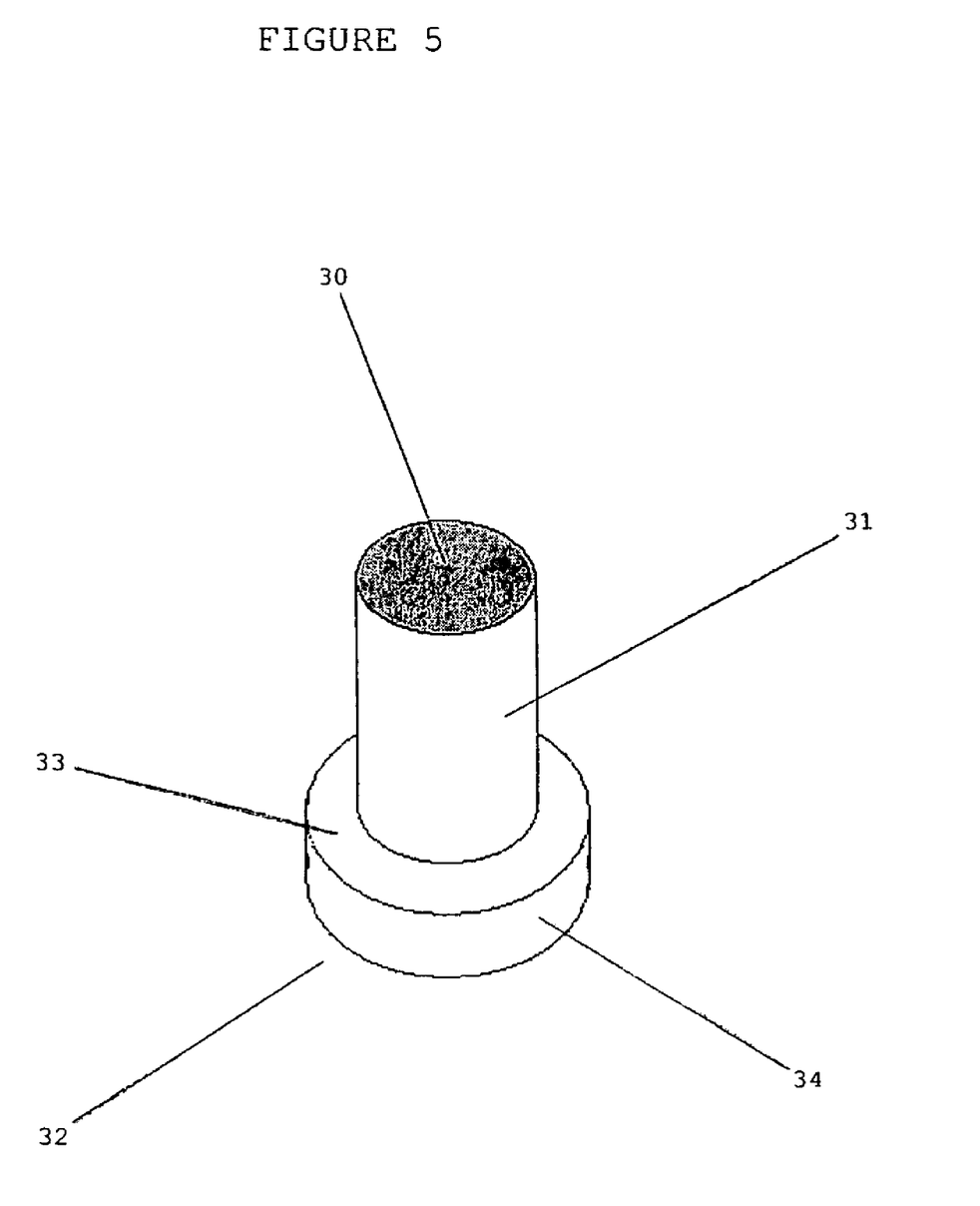
Figure 6:
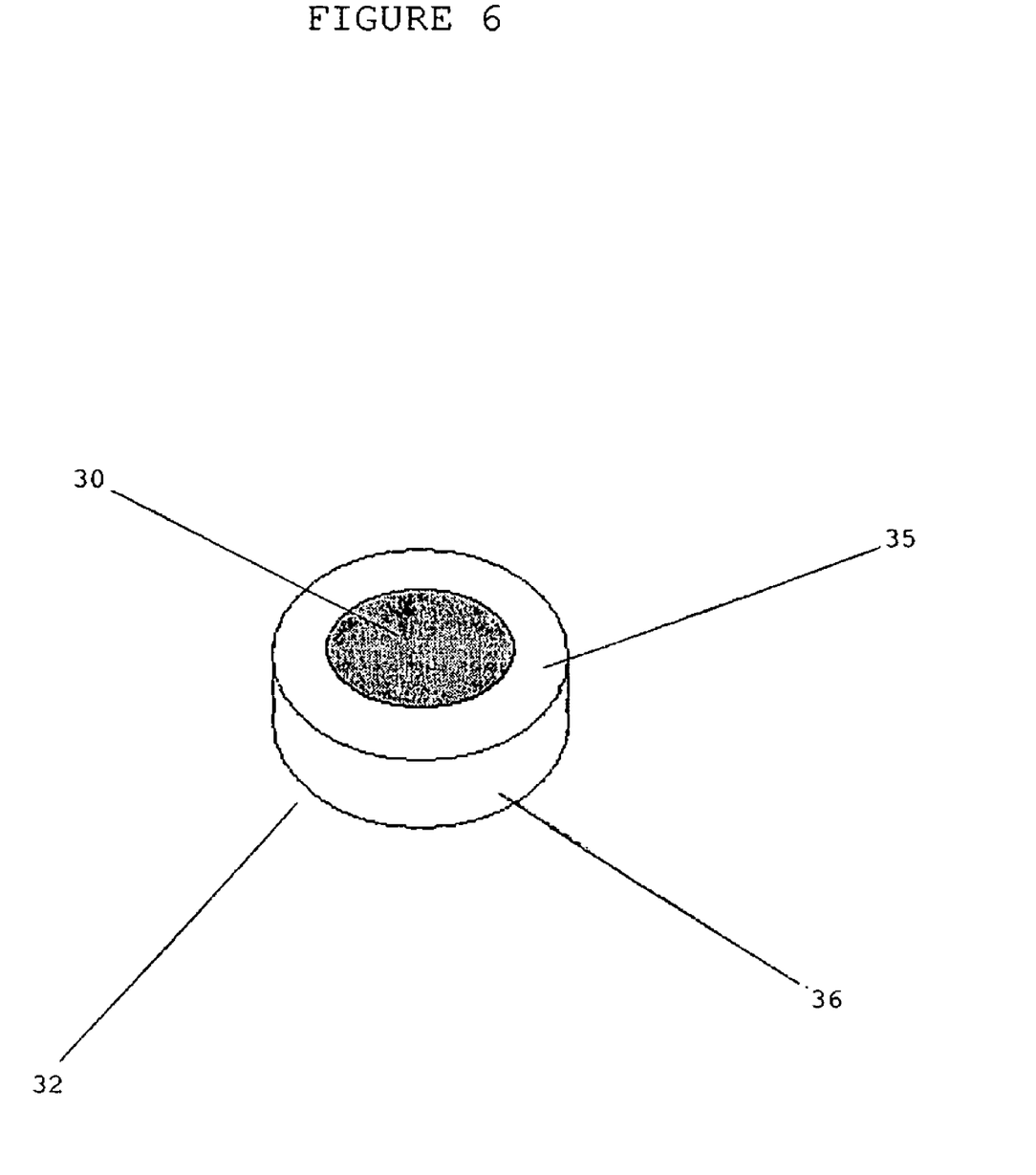

The preferred embodiment depends on the type and style of camera, or recording device, the invention is to be used. There are three basic types that will adapt to most cameras, recording devices and other sensors. FIGS. 1, 2 and 3 illustrate two operational modes for this invention. FIG. 1 illustrates a compact mode of operation. This mode produces very bright spectrums. FIGS. 2 and 3 illustrate a high resolution mode of operation. This mode produces finer wavelength resolution then available when operating in the compact mode. Either of these embodiments can be designed for either of the two operational modes. The invention can only function in one operational mode at a time. FIGS. 4, 5 and 6 show three preferred embodiments of this invention.

The three different embodiments presented herein are all preferred embodiments which are dependant on the physical characteristics of the recording device, or camera or other type of sensor 27, the invention is to be used. FIG. 4 shows the preferred embodiment for a recording device that requires a type of friction fit, or a strap fit, to hold the invention in front of its sensor 27. FIG. 5 shows the preferred embodiment for a recording device that requires a screw or threaded type of fit, or other attachment to hold the invention to the outer side of the recorder's body to hold the invention so that its grating 30 is held in front of and in close proximity to the sensor 27. FIG. 6 shows the preferred embodiment for a recording device that requires the invention to fit in a tray or pan assembly, or other enclosed assembly located close to the sensor 27, to hold the invention in close proximity and in front of the sensor 27.

Detailed Description

FIG. 1 is a diagram of a light ray 20 from an object passing trough a coarse grating 21 and being separated into a colored spectrum 26 with the object's image 28 located to the left of its full spectrum 26 and both images fall on the sensor 27.

This figure illustrates how a compact spectrum 26 version works. This design will also yield the brightest spectrum 26 image as the spectrum's image itself would generally be much shorter than the width of the light sensor 27. This brighter spectral image will result in much dimmer objects being detected to produce spectrums then is possible using currently available spectral devices.

The optimum spacing between the coarse grating 21 surface and the light sensor 27 surface is a function of the number of grating 30 lines per unit length, shown as L in FIG. 1, and the width of the light sensor 27. Once the width of the light sensor 27 is known and what the minimum physical distance obtainable is (due to physical limitations inherent in the recording device's lens well) then the fineness of the grating 30 can be determined which will produce a referenced spectrum 26 which will image the red portion 22 of the object's spectrum 26, to the blue portion 23 of its spectrum 26 and the object's image 28 as well.

If there is space available in the lens well then the fineness of the grating 30 can be fixed and the spectral device's housing 31 can be adjusted to place the grating 30 at the optimum distance from the light sensor 27.

FIG. 2 is a diagram of a light ray 20 from an object passing trough a fine grating 29 and being separated into a colored spectrum 26 with the object's image 28 located to the left of the blue portion 23 of its spectrum 26 and both images fall on the sensor 27.

This illustrates how a high resolution version, which is also embodied in this invention, would work. The high resolution version would extend the spectrum 26 across two images where the first image would contain the object's image 28 as well as the blue portion 23 of its spectrum 26. Here, the reference distance would be between the object's image 28 and the blue portion 23 edge of its spectrum 26. After the first image was made then the pointing or capturing device, such as a telescope, would be moved until the object's image 28 was no longer on the sensor 27, refer to FIG. 3.

The second image would contain the entire spectral image from the blue portion 23 to the red portion 22 but without the object's image 28 being present. By stretching the entire spectrum 26 out over the entire width of the light sensor 27 the line width resolution would be several times better than is possible with the Compact Spectrum 26 Design shown in FIG. 1.

This way the distance between the object and the blue portion 23 edge of the spectrum 26 can be measured on the first photograph. Then on the second photograph distances to unknown spectral lines would be measured from the blue portion 23 edge of the spectrum 26 to the unknown line and the reference distance measured from the first photograph would be added to this distance.

Once the distance from the object to an unknown line is measured the wavelength of the unknown line would follow from the angle 24 equation 25 shown in FIG. 3. Here, LH is the fineness of the grating 30 in lines/mm.

FIG. 3 is a diagram of a light ray 20 from an object passing trough a fine grating 29 and being separated into a colored spectrum 26 with the object's image 28 located off of and to the left of the sensor 27 and its full spectrum 26 falls on the sensor 27.

This illustrates how the entire spectrum 26 is captured with the high resolution version. To get the sensor 27 into this position the pointing device is angled away from the object until the image of the object falls off of the edge of the light sensor 27. If the pointing or capturing device is a telescope, then the telescope, is just moved off to the side of the object a small amount. Then the entire spectrum 26 image of the object will fall on the sensor 27. The optimum spacing between the grating 30 and the sensor 27 is again determined after the width of the sensor 27 is known and the fineness of the grating 30 being used.

After the device has been positioned at the optimum distance from the light sensor 27 it will need to be held in place there. Several, but not all, methods will be set out here to include a snug friction fit, a lose friction fit, a threaded holder, a strap or belt or tape assembly affixed to or between the invention and the recording device, any or all of these methods can be used to place and hold the spectrum 26 device at the optimum distance from the light sensor 27 in addition to other methods of choice.

Type I—Preferred Embodiment: Generally used with recording devices, or cameras, that have no lens assembly or have a removable lens assembly and having an empty mounting area in the light path that has rough sides to afford a friction fit between the invention and the mounting area's wall. This embodiment is illustrated by FIG. 4.

FIG. 4 is a front elevation view of a housing 31 with a grating 30 covering the top end of the housing 31, while the bottom 32 end of the housing 31 is free to allow the light to pass through. The bottom 32 end may be fitted with some form of transparent material or left completely open.

This shows the invention ready to be used with certain cameras available today and illustrates what a device designed to conform to the requirements set out in FIG. 1 could look like.

This embodiment is a small round metal cylinder with a transparent grating 30 shown covering the top. The bottom 32 side of the cylinder is free to allow light to pass through to the grating 30, either through some form of a transparent material or completely open. In a real life example the grating 30 end would be located very close to the light sensor 27. This type of device is designed to be held in place by friction between the lens well walls and the outside cylinder wall.

The grating 30 surface is held at the optimum distance from the sensor 27 by inserting it as far down the empty lens well as possible where friction between the wall sides will hold it in place. If there is insufficient friction to hold the invention in place an additional friction method may be used to hold it securely in place. The end of the invention would protrude into the empty lens well, where it would reside in close proximity to the light sensor 27.

Type II—Preferred Embodiment: Generally used on recording devices, or cameras, fitted with some type of protruding lens housing, that may or may not have threads, on its body and having no lens assembly or having a removable lens assembly, that is in the light path. This embodiment is illustrated by FIG. 5.

FIG. 5 is a front elevation view of a housing 31 with a grating 30 covering the top end of the housing 31, while the bottom 32 end of the housing 31 is fitted to a washer 33 which is fitted to a lower housing 34 whose bottom 32 is free to allow the light to pass through. The bottom 32 end may be fitted with some form of transparent material or left completely open.

Here, the housing 31, shown in FIG. 4, is attached to the lower housing 34 with a washer 33. This lower housing 34 may have threads, clamps, hooks, straps, or other means of attachment associated with it to hold or affix it in front of a light sensor 27.

This embodiment of the invention has the housing 31 as a protrusion that fits within the empty lens well of a recording device, or camera. The grating 30 surface is held at the optimum distance from the sensor 27 by the housing 31, the washer 33 and the lower housing 34 units. The attachment to the recording device, here, is between the lower housing 34 and the recorder body. A typical installation would have the invention screwed onto a camera's filter threads while the housing 31 and grating 30 end of the invention would protrude into the empty lens well, where they will reside in close proximity to the light sensor 27.

Type III—Preferred Embodiment: Generally used on recording devices, or cameras, fitted with trays or pans or enclosed recessed areas, or with optical eyepieces located in the light path in proximity to the sensor 27. This embodiment is illustrated by FIG. 6.

FIG. 6 is a front elevation view of a large housing 36 with a large washer 35 covering its top and a grating 30 is covering the open part of the large washer 35, while the bottom 32 end of the large housing 36 is free to allow the light to pass through. The bottom 32 end may be fitted with some form of transparent material or left completely open.

This illustrates another possible embodiment of this invention. Here the larger housing 31 may have threads, clamps, hooks, straps, or other means of attachment associated with it to hold or affix it in front of a light sensor 27. In this embodiment the grating 30 surface(s) may be covered with some form of transparent covering material that will protect the grating 30 from damage as it is very delicate, along with cover spacers that may need to be inserted between the grating 30 and the cover material so the cover material does not press down directly on the grating 30 material deforming it.

This embodiment of the invention fits in front of a recorder's, or camera's, sensor 27 generally in an enclosed area in close proximity to the sensor 27. It is held in place through the use of straps, threads, friction, trays or pans on the large housing 36. The grating 30 would be positioned at the optimum location by changing the thickness of the large housing 36 or the large washer 35, during manufacturer of the invention, and by selecting the fineness of the grating 30 to be used.

The grating 30 material used in this embodiment can be either a single plane grating 30 or a dual plane grating 30. The dual plane grating 30 is well suited for visual observations. As with the single plane grating 30 the dual plane grating 30 also needs to be positioned at the optimum location by selecting the grating 30 fineness to produce multiple referenced spectrum 26.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus to produce spectrums comprising:
   an apparatus housing that receives a source of light from a telescope,
   wherein the housing fits inside a camera's empty lens well;
   means for fitting the housing within the lens well; and
   a transparent diffraction grating material rigidly connected to the housing;
   wherein the grating is located near the camera's photo sensor to receive the spectrum, and
   wherein the apparatus does not require a threaded eyepiece.

2. An apparatus to produce spectrums comprising:
   a lower housing that receives a source of light from a telescope from a bottom end of the apparatus;
   a housing that loosely fits the inside of a camera's empty lens well;
   a washer connecting the lower housing to the housing;
   a transparent diffraction grating material rigidly connected to the housing; and
   a means for fitting the apparatus to the camera;
   wherein the apparatus does not require a threaded eyepiece; and
   wherein said grating is located near the camera's photo sensor to receive the spectrum.

3. The apparatus to produce spectrums in accordance with claim 1, wherein the housing incorporates a transparent cover material that protects the grating.

4. The apparatus to produce spectrums in accordance with claim 2, wherein the housing incorporates a transparent cover material that protects the grating.

5. The apparatus to produce spectrums in accordance with claim 2, wherein the means for fitting the apparatus to the camera comprises threads.

* * * * *